United States Patent
Nanchi et al.

(10) Patent No.: US 10,005,938 B2
(45) Date of Patent: Jun. 26, 2018

(54) THERMOSENSITIVE ADHESIVE

(71) Applicant: NITTA CORPORATION, Osaka-shi, Osaka (JP)

(72) Inventors: Minoru Nanchi, Yamatokohriyama (JP); Koji Yamashita, Yamatokohriyama (JP); Ayumi Nagao, Yamatokohriyama (JP); Shinichiro Kawahara, Yamatokohriyama (JP)

(73) Assignee: Nitta Corporation, Osaka (JP)

( * ) Notice: Subject to any disclaimer, the term of this patent is extended or adjusted under 35 U.S.C. 154(b) by 181 days.

(21) Appl. No.: 14/783,333

(22) PCT Filed: Apr. 24, 2014

(86) PCT No.: PCT/JP2014/061516
§ 371 (c)(1),
(2) Date: Oct. 8, 2015

(87) PCT Pub. No.: WO2014/188840
PCT Pub. Date: Nov. 27, 2014

(65) Prior Publication Data
US 2016/0068727 A1 Mar. 10, 2016

(30) Foreign Application Priority Data
May 24, 2013 (JP) ................................. 2013-110197

(51) Int. Cl.
| | |
|---|---|
| *C09J 193/04* | (2006.01) |
| *C09J 133/16* | (2006.01) |
| *C09J 133/08* | (2006.01) |
| *C09J 7/35* | (2018.01) |
| *C09J 133/02* | (2006.01) |
| *C09D 133/16* | (2006.01) |
| *C08F 220/18* | (2006.01) |
| *C08K 5/07* | (2006.01) |
| *C08K 5/00* | (2006.01) |

(52) U.S. Cl.
CPC ........... *C09J 193/04* (2013.01); *C08F 220/18* (2013.01); *C08K 5/07* (2013.01); *C09D 133/16* (2013.01); *C09J 7/35* (2018.01); *C09J 133/02* (2013.01); *C09J 133/08* (2013.01); *C09J 133/16* (2013.01); *C08F 2220/1891* (2013.01); *C08K 5/0091* (2013.01); *C09J 2433/00* (2013.01)

(58) Field of Classification Search
None
See application file for complete search history.

(56) References Cited

U.S. PATENT DOCUMENTS

| 4,934,791 A * | 6/1990 | Shimizu | G02F 1/133516 252/582 |
|---|---|---|---|
| 6,353,066 B1 * | 3/2002 | Sosa | C08F 12/04 526/224 |
| 6,440,553 B2 * | 8/2002 | Tokunaga | C09J 169/00 428/343 |
| 7,598,321 B2 * | 10/2009 | Talkowski | C08F 210/02 525/196 |
| 2006/0279923 A1 * | 12/2006 | Kim | C09J 133/06 361/679.01 |
| 2009/0053519 A1 | 2/2009 | Ogawa et al. | |
| 2010/0230036 A1 * | 9/2010 | Habu | C09J 133/066 156/154 |
| 2011/0223420 A1 * | 9/2011 | Ichiroku | C08L 71/00 428/355 EP |
| 2011/0245614 A1 * | 10/2011 | Nakamura | A61B 1/0011 600/140 |
| 2012/0062823 A1 * | 3/2012 | Takatani | G02B 5/3033 349/96 |
| 2012/0181702 A1 * | 7/2012 | Lee | C09J 163/00 257/774 |

FOREIGN PATENT DOCUMENTS

| JP | 63-118385 A | 5/1988 |
|---|---|---|
| JP | 63-130686 A | 6/1988 |
| JP | 2-001785 A | 1/1990 |
| JP | 11-140400 A | 5/1999 |
| JP | 2002-258252 A | 9/2002 |
| JP | 2004-292529 A | 10/2004 |
| JP | 2009-046535 A | 3/2009 |
| JP | 2011-042785 A | 3/2011 |
| JP | 2012-102212 A | 5/2012 |
| JP | 2012-197387 A | 10/2012 |
| JP | 2012-209001 A | 10/2012 |

OTHER PUBLICATIONS

Machine translation of JP 2012102212 A ( 2012).*
International Search Report, PCT/JP2014/061516, dated Jul. 22, 2014, 3 pgs.

* cited by examiner

*Primary Examiner* — Frank D Ducheneaux
(74) *Attorney, Agent, or Firm* — Volpe and Koenig, P.C.

(57) ABSTRACT

A thermosensitive adhesive contains a side chain crystal polymer having a melting point of 20-30° C., and a tackifier. The side chain crystal polymer is obtainable by adding a metal chelate compound in the following amount of addition (A) into the following copolymer, followed by a crosslinking reaction. Adhesive strength is to be deteriorated at a temperature below the melting point. The copolymer is obtainable by polymerizing 25-30 parts by weight of (meth) acrylate having a straight-chain alkyl group having 16 to 22 carbon atoms, 60-65 parts by weight of (meth)acrylate having an alkyl group having 1 to 6 carbon atoms, 1-10 parts by weight of a polar monomer, and 1-10 parts by weight of a reactive fluorine compound. The amount of addition (A) is 3-10 parts by weight with respect to 100 parts by weight of a copolymer.

15 Claims, No Drawings

US 10,005,938 B2

THERMOSENSITIVE ADHESIVE

This application is the U.S. National Stage of International Application No. PCT/JP2014/061516, filed Apr. 24, 2014, and claims benefit of priority from JP Patent Application No. 2013-110197, filed May 24, 2013, the contents of which are incorporated by reference.

TECHNICAL FIELD

The present invention relates to a thermosensitive adhesive.

BACKGROUND ART

Substrates for use in the field of flat panel displays (hereinafter generally referred to as "FPDs") or the like are often made of glass. Electronic devices having the FPD mounted thereon, such as cellular phones and notebook PCs, constantly need to be lighter, thinner, and durable. Depending on the purpose of use, flexibility is further needed. It is difficult for a glass substrate to meet these needs. Therefore, a consideration has been made to change the glass substrate to a plastic substrate.

However, when changed to the plastic substrate, handling thereof becomes difficult due to flexibility thereof, thus causing the problem that it is difficult to use an existing production facility.

Patent Document 1 describes a structure that makes it possible to handle the plastic substrate in the existing production facility by using a thermosensitive adhesive. That is, according to Patent Document 1, the plastic substrate is temporarily secured to a glass base by interposing therebetween the thermosensitive adhesive whose adhesive strength is reversibly controllable by heat. Then, after a functional film is deposited on a surface of the plastic substrate, temperature is lowered to reduce the adhesive strength of the thermosensitive adhesive, and the plastic substrate with the functional film is then peeled off from the glass base to obtain an object.

However, the handling performance during a process is not taken into consideration in the conventional thermosensitive adhesive as described in Patent Document 1. Therefore, handling defectiveness may occur during the process.

In addition to the handling performance, the following is needed for the thermosensitive adhesive used for temporarily securing the plastic substrate. That is, chemical resistance in photolithography, washing process, or the like is needed. Depending on the process, the thermosensitive adhesive may be exposed to a high-temperature atmosphere exceeding 100° C., and hence heat resistance is also needed. Specifically, it is necessary to suppress floating of the substrate in the high-temperature atmosphere, and it is also needed to suppress a dimensional change of the substrate due to a temperature change from room temperature to high temperatures. Furthermore, easy peeling property needs to cope with an occasion that a peeling stress increases with increasing substrate size. The conventional thermosensitive adhesive failed to sufficiently cope with these needs.

RELATED ART DOCUMENTS

Patent Document

Patent Document 1: Japanese Unexamined Patent Publication No. 2002-258252

SUMMARY OF THE INVENTION

Problems to be Solved by the Invention

An object of the present invention is to provide a thermosensitive adhesive having excellent handling performance, chemical resistance, heat resistance, and easy peeling property.

Means of Solving the Problems

A thermosensitive adhesive of the present invention contains a side chain crystal polymer having a melting point of 20-30° C., and a tackifier. The side chain crystal polymer is obtainable by adding a metal chelate compound in the following amount of addition (A) into the following copolymer, followed by a crosslinking reaction. Adhesive strength is to be deteriorated at a temperature below the melting point. The copolymer is obtainable by polymerizing 25-30 parts by weight of (meth)acrylate having a straight-chain alkyl group having 16 to 22 carbon atoms, 60-65 parts by weight of (meth)acrylate having an alkyl group having 1 to 6 carbon atoms, 1-10 parts by weight of a polar monomer, and 1-10 parts by weight of a reactive fluorine compound. The amount of addition (A) is 3-10 parts by weight with respect to 100 parts by weight of a copolymer.

Effects of the Invention

The present invention produces the effects that the thermosensitive adhesive is excellent in all of handling performance, chemical resistance, heat resistance, and easy peeling property.

EMBODIMENTS FOR CARRYING OUT THE INVENTION

A thermosensitive adhesive according to an embodiment of the present invention is described in detail below. The thermosensitive adhesive of the present embodiment contains a side chain crystal polymer. The side chain crystal polymer is a polymer having a melting point. The melting point denotes a temperature at which a specific portion of the polymer initially aligned in an orderly array enters a disordered state by a certain equilibrium process. The temperature is a value obtainable from a measurement under measuring condition of 10° C./min by a differential scanning calorimetry (DSC).

The side chain crystal polymer is to be crystallized at a temperature below the melting point. The side chain crystal polymer is subjected to phase transition and shows fluidity at a temperature above the melting point. That is, the side chain crystal polymer has thermosensitivity that reversibly causes a crystal state and a flow state correspondingly to a temperature change. The thermosensitive adhesive of the present embodiment contains the side chain crystal polymer in such a proportion that the adhesive strength deteriorates when the side chain crystal polymer is crystallized at the temperature below the melting point. That is, the thermosensitive adhesive of the present embodiment contains the side chain crystal polymer as a main ingredient, and is substantially composed of the side chain crystal polymer. Therefore, when peeling off the thermosensitive adhesive from an adherend, crystallization of the side chain crystal polymer contributes to reducing the adhesive strength by cooling the thermosensitive adhesive to the temperature below the melting point of the side chain crystal polymer. By heating the thermosensitive adhesive to a temperature above the melting point of the side chain crystal polymer, the side chain crystal polymer shows fluidity, thus contributing to recovering the adhesive strength. This permits repetitive use.

The melting point of the side chain crystal polymer of the present embodiment is 20-30° C. Thus, the side chain crystal polymer shows fluidity and the thermosensitive adhesive has adhesive property at atmospheric temperatures during a normal process. This makes it possible to surely secure the adherend and produce excellent handling performance during the process. When cooling the thermosensitive adhesive to the temperature below the melting point of the side chain crystal polymer in order to peel off the thermosensitive adhesive from the adherend, it is possible to sufficiently cool the thermosensitive adhesive to the temperature below the melting point with relatively less cooling energy. Thus, excellent peeling property is also producible.

The melting point is adjustable by changing, for example, a composition of the side chain crystal polymer. The side chain crystal polymer of the present embodiment is obtainable by adding a specific amount of a metal chelate compound into a copolymer having a specific composition, followed by crosslinking reaction.

To be specific, the copolymer of the present embodiment is obtainable by polymerizing 25-30 parts by weight of (meth)acrylate having a straight-chain alkyl group having 16 to 22 carbon atoms, 60-65 parts by weight of (meth)acrylate having an alkyl group having 1 to 6 carbon atoms, 1-10 parts by weight of a polar monomer, and 1-10 parts by weight of a reactive fluorine compound.

This composition contributes to producing one having suitable adhesive strength and excellent heat resistance. This composition also contributes to the following. That is, when the thermosensitive adhesive is cooled to the temperature below the melting point of the side chain crystal polymer, the adhesive strength decreases due to the crystallization of the side chain crystal polymer, and mold release property due to the fluorine compound is added. These make it possible to sufficiently decrease the adhesive strength so as to produce excellent easy peeling property. Specifically, 180° peel strength at an atmospheric temperature of 5° C. (hereinafter referred to generally as 180° peel strength at 5° C.) is adjustable to less than 0.15 N/25 mm, preferably 0.1 N/25 mm or less. The 180° peel strength at 5° C. is a value to be measured according to JIS Z0237.

Moreover, the above composition ensures that after the adherend being affixed is exposed to an atmospheric temperature of 100-220° C., the adherend is removable at the temperature below the melting point. That is, when the thermosensitive adhesive with the adherend being affixed thereto is exposed to the high-temperature atmosphere, the thermosensitive adhesive becomes soft and follows an uneven shape existing on a surface of the adherend. Consequently, when the atmospheric temperature decreases, so-called anchoring effects appear and the adhesive strength of the thermosensitive adhesive becomes greater than initial adhesive strength. The thermosensitive adhesion of the present embodiment ensures easy removal of the adherend because the adhesive strength deteriorates sufficiently for the above reasons by cooling the thermosensitive adhesive to the temperature below the melting point even when the adhesive strength becomes greater than the initial adhesive strength due to the exposure to the high-temperature atmosphere.

Examples of the adherend include plastic substrates in FPDs. Examples of materials constituting the plastic substrates include polycarbonate, polyethylene terephthalate, polymethyl methacrylate, polyimide, polyethylene naphthalate, polyether sulfone, and cyclo-olefin polymer. For example, easy adherence treatment, hard coat treatment, or the like may be applied to the plastic substrates.

Examples of the (meth)acrylate having a straight-chain alkyl group having 16 to 22 carbon atoms include (meth)acrylates having a linear alkyl group having 16 to 22 carbon atoms, such as cetyl (meth)acrylate, stearyl (meth)acrylate, eicosyl (meth)acrylate, and behenyl (meth)acrylate. Examples of (meth)acrylate having the alkyl group having 1 to 6 carbon atoms include methyl (meth)acrylate, ethyl (meth)acrylate, butyl (meth)acrylate, and hexyl (meth)acrylate. Examples of the polar monomer include ethylenically unsaturated monomers having a carboxylic group, such as acrylic acid, methacrylic acid, crotonic acid, itaconic acid, maleic acid, and fumaric acid; and ethylenically unsaturated monomers having a hydroxyl group, such as 2-hydroxyethyl (meth)acrylate, 2-hydroxypropyl (meth)acrylate, and 2-hydroxyhexyl (meth)acrylate. These may be used singly or as a mixture of two or more kinds. The (meth)acylate denotes acrylate or methacrylate.

The reactive fluorine compound denotes a fluorine compound having a functional group showing reactivity. Examples of the functional group showing reactivity include groups having an ethylenically unsaturated double bond, such as vinyl group, aryl group, (meth)acrylic group, (meth)acryloyl group, and (meth)acryloyloxy group; and epoxy group (including glycidyl group and epoxycycloalkyl group), mercapto group, carbinol group, carboxyl group, silanol group, phenol group, amino group, and hydroxyl group.

Specific examples of the reactive fluorine compound include compounds represented by the following general formula (I).

$$R_1\text{—}CF_3 \quad (I)$$

wherein $R_1$ is a group: $CH_2=CHCOOR^2-$ or $CH_2=C(CH_3)COOR^2-$ (wherein $R^2$ is an alkylene group).

Examples of the alkylene group represented by $R^2$ in the general formula (I) include straight chain or branched alkylene groups having 1 to 6 carbon atoms, such as methylene group, ethylene group, trimethylene group, methylethylene group, propylene group, tetramethylene group, pentamethylene group, and hexamethylene group.

Specific examples of the compound represented by the general formula (I) include compounds represented by the following formulas (Ia) or (Ib). The present embodiment preferably employs the compounds represented by the formula (Ia).

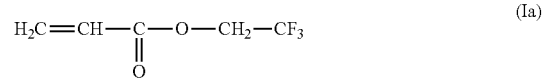

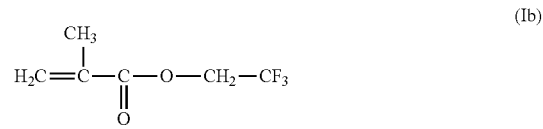

As the reactive fluorine compound, a commercially available one is usable. Examples of the commercially available reactive fluorine compound include "Biscoat 3F", "Biscoat 3FM," "Biscoat 4F," "Biscoat 8F," "Biscoat 8FM," all of which are produced by OSAKA ORGANIC CHEMICAL INDUSTRY LTD., and "LIGHT ESTER M-3F" produced by KYOEISHA CHEMICAL CO., LTD.

Preferable monomer ingredients of these illustrated monomers are compounds in which the (meth)acrylate having a straight chain alkyl group having 16 to 22 carbon atoms is stearyl (meth)acrylate, the (meth)acrylate having an alkyl group having 1 to 6 carbon atoms is methyl (meth) acrylate, the polar monomer is acrylic acid, and the reactive fluorine compound is a compound represented by the general formula (I).

Particularly, when the (meth)acrylate having the alkyl group having 1 to 6 carbon atoms is methyl (meth)acrylate, it is possible to improve heat resistance of the thermosensitive adhesive. Specifically, methyl (meth)acrylate functions as an ingredient that imparts a cohesive force to the thermosensitive adhesive. A proportion of the (meth)acrylate having 1 to 6 carbon atoms is 60-65 parts by weight as described earlier. Therefore, when the (meth)acrylate having the alkyl group having 1 to 6 carbon atoms is methyl (meth)acrylate, the side chain crystal polymer contains methyl (meth)acrylate as a major ingredient. Consequently, the cohesive force of the thermosensitive adhesive is improved, and the heat resistance thereof is improved.

A method of polymerizing the monomer is not particularly limited. For example, solution polymerization method, bulk polymerization method, suspension polymerization method, or emulsion polymerization method may be employed. When the solution polymerization method is employed, the monomer needs to be added into a solvent and stirred at approximately 40-90° C. for approximately 2-10 hours.

A weight average molecular weight of the copolymer is preferably 100,000 or more, more preferably 300,000-800,000, and still more preferably 450,000-650,000. The weight average molecular weight is obtainable by measuring the copolymer with a gel permeation chromatography (GPC) and expressing a measured value in terms of polystyrene.

The present embodiment employs a metals chelate compound as a crosslinking agent that allows the copolymer to be subjected to a crosslinking reaction. Unlike a normal crosslinking reaction to form a covalent bond, the copolymer and the metal chelate compound form a coordinate bond by using the metal chelate compound. The coordinate bond has a higher degree of freedom and is more likely to flow than the covalent bond. This tendency becomes significant in the high-temperature atmosphere. Fluidity contributes to hardness of the side chain crystal polymer, and the hardness contributes to adhesive strength. Heat resistance of the thermosensitive adhesive is improved by crosslinking the copolymer with the metal chelate compound.

In the present embodiment, an amount of addition (A) of the metal chelate compound is 3-10 parts by weight, preferably 6-10 parts by weight with respect to 100 parts by weight of the copolymer. The amount of addition (A) is larger than an amount of addition of a normal crosslinking agent. Therefore, when the copolymer is crosslinked by the amount of addition (A), the copolymer is subjected to a high crosslinking, and the degree of freedom and the fluidity of the coordinate bond are to be suitably restricted. Accordingly, softness of the side chain crystal polymer is to be restricted in such a range that makes it possible to obtain suitable adhesive strength. Consequently, hardness of the thermosensitive adhesive increases, and an amount of deformation thereof is suitably reduced.

To be specific, a storage elastic modulus E' at 200° C. is usually 0.1 MPa or more. The storage elastic modulus E' at 200° C. is a value obtainable by making a measurement with a measuring method described in Examples described later. By securing the plastic substrate onto the glass base with the thermosensitive adhesive interposed therebetween, the following effect is obtainable. That is, when the adhesive having a high storage elastic modulus E' is applied to the glass base having a low coefficient of linear expansion, the adhesive causes no deformation and a coefficient of linear expansion thereof seemingly becomes identical with a coefficient of liner expansion of the glass base. Then, when the plastic substrate is affixed onto the adhesive, the coefficient of liner expansion of the plastic substrate becomes identical with the coefficient of linear expansion of the glass base on the same principle as described above. That is, the adhesive having the high storage elastic modulus E' is capable of transmitting the coefficient of linear expansion of the glass base to the plastic substrate. Hence, when the plastic substrate is secured onto the glass base with the thermosensitive adhesive interposed therebetween, a coefficient of linear expansion of the entirety of the glass base, thermosensitive adhesive, and plastic substrate artificially becomes identical with the coefficient of linear expansion of the glass base. This makes it possible to suppress the floating of the substrate in the high-temperature atmosphere and also suppress the dimensional change of the substrate due to the temperature change from room temperature to high temperatures, thereby producing high heat resistance. Additionally, the highly crosslinked copolymer makes it difficult for chemicals to enter the thermosensitive adhesive. This ensures high chemical resistance as well as a tendency to become excellent peel property. An upper limit value of the storage elastic modulus E' at 200° C. is not particularly limited as long as the above effect is obtainable. It is, however, preferably 10 MPa, more preferably 5 MPa, and still more preferably 2 MPa.

Examples of the metal chelate compound include acetylacetone coordinated compounds of polyvalent metals and acetoacetic acid ester coordinated compounds of polyvalent metals. Examples of the polyvalent metals include aluminum (Al), nickel, chrome, iron, titanium (Ti), zinc, cobalt, manganese, and zirconium (Zr). These may be used singly or as a mixture of two or more kinds. Particularly, an acetylacetone coordinated compound or acetoacetic acid ester coordinated compound of aluminum is preferable, and aluminum trisacetylacetonate is more preferable among these illustrated metal chelate compounds because these have excellent pot life (usable time) and contribute to improving working efficiency.

The crosslinking reaction is executable by adding the metal chelate compound into the copolymer, followed by heating and drying. As heating and drying conditions, temperature is approximately 90-110° C., and time is approximately 10-20 minutes.

The thermosensitive adhesive of the present embodiment preferably further contains acetylacetone. Acetylacetone functions as a crosslinking delaying agent. When the thermosensitive adhesive further contains acetylacetone, the crosslinking reaction owing to the metal chelate compound can be delayed to suppress an increase in viscosity in a short time, thus leading to improved pot life. The addition of acetylacetone is preferably carried out before the addition of the metal chelate compound. An amount of addition (C) of acetylacetone is preferably identical with the amount of addition (A) of the metal chelate compound, without being limited thereto.

The thermosensitive adhesive of the present embodiment further contains a tackifier. This ensures suitable adhesive strength, making it possible to produce excellent easy peeling property. A softening point of the tackifier is preferably 100° C. or more, more preferably 130° C. or more, and still more preferably 150° C. or more. Although an upper limit value of the softening point is not particularly limited, it is usually 170° C. or less, preferably 165° C. or less because it is difficult to prepare the tackifier having an extremely high softening point. The softening point is a value to be measured according to the ring and ball method as defined in JIS K 5902.

An amount of addition (B) of the tackifier is preferably 10-30 parts by weight, more preferably 10-20 parts by weight with respect to 100 parts by weight of the copolymer. When the softening point of the tackifier is 150° C. or more, there is a tendency that the easy peeling property improves by increasing the content of the tackifier.

Examples of the composition of the tackifier include rosin-based resins, terpene-based resins, hydrocarbon-based resins, epoxy-based resins, polyamide-based resins, phenol-based resins, and ketone-based resins. These may be used singly or as a mixture of two or more kinds. The rosin-based resins are preferred among these illustrated tackifiers. The rosin-based resins produce excellent compatibility with the copolymer described above.

Examples of the rosin-based resins include rosin derivatives. Examples of the rosin derivatives include rosin esters obtainable by esterifying, with alcohols, a nonmodified rosin (raw rosin), such as gum rosin, wood rosin, or tall oil rosin, or a modified rosin, such as hydrogenated rosin, disproportionated rosin, or polymerized rosin; metal salts of rosins, such as these nonmodified rosins, these modified rosins, and these various kinds of rosin derivatives; and rosin phenol resins obtainable by appending, with an acid catalyst, phenol to these nonmodified rosins, these modified rosins, or these various kinds of rosin derivatives, followed by thermal polymerization.

Polymerized rosin ester is preferred among these illustrated rosin derivatives. As the polymerized rosin ester, a commercially available one is usable. Examples of the commercially available polymerized rosin ester include "Pensel D-160" produced by Arakawa Chemical Industries, Ltd.

As a form of use of the thermosensitive adhesive of the present embodiment, there is, for example, a substrateless sheet-shaped form. The term "sheet-shape" is a concept that covers from the sheet-shape to a film-shape without being limited to the sheet-shape, as long as the effect of the present embodiment is not impaired. When the thermosensitive adhesive is used as a thermosensitive adhesive sheet, a thickness thereof is preferably 15-400 μm, more preferably 120-150 μm.

The thermosensitive adhesive of the present embodiment is also usable in a tape-shaped form. When the thermosensitive adhesive is used as a thermosensitive adhesive tape, an adhesive layer composed of the thermosensitive adhesive of the present embodiment may be laminated on one surface or both surfaces of a film-shaped substrate. The term "film-shape" is a concept that covers from the film-shape to the sheet-shape without being limited only to the film-shape, as long as the effect of the present embodiment is not impaired.

Examples of a material constituting the substrate include synthetic resins, such as polyethylene, polyethylene terephthalate, polypropylene, polyester, polyamide, polyimide, polycarbonate, ethylene-vinyl acetate copolymers, ethylene-ethyl acrylate copolymers, ethylene-polypropylene copolymers, and polyvinyl chloride.

The substrate may be either a single layer body or multilayer body, and a thickness thereof is usually approximately 5-500 μm. For the purpose of enhancing adhesion to the adhesive layer, the substrate may be subjected to surface treatment, such as corona discharge treatment, plasma treatment, blast treatment, chemical etching treatment, or primer treatment.

A method of disposing the adhesive layer on one surface of both surfaces of the substrate may include applying a coating solution, which is obtainable by adding a solvent into the thermosensitive adhesive, to one surface or both surfaces of the substrate by a coater or the like, followed by drying. Examples of the coater include knife coater, roll coater, calendar coater, comma coater, gravure coater, and rod coater.

A thickness of the adhesive layer is preferably 5-60 μm, more preferably 10-60 μm, and still more preferably 10-50 μm. A thickness of the adhesive layer on one surface and a thickness of the adhesive layer on another surface may be the same or different.

In the present embodiment, as long as the adhesive layer on one surface is composed of the thermosensitive adhesive, the adhesive layer on another surface is not particularly limited. For example, when the adhesive layer on the another surface is made up of an adhesive layer composed of the thermosensitive adhesive, a composition of the adhesive layer may be the same as or different from a composition of the adhesive layer on the one surface.

Alternatively, the adhesive layer on the another surface may be made of an adhesive layer composed of, for example, a pressure-sensitive adhesive. The pressure-sensitive adhesive is a polymer having adhesive property, such as natural rubber adhesive, synthetic rubber adhesive, styrene/butadiene latex base adhesive, and acrylic-based adhesive.

A mold releasing film is preferably laminated on a surface of each of the thermosensitive adhesive sheet and the thermosensitive adhesive tape according to the present embodiment. As the mold releasing film, there is, for example, one obtainable by applying a mold releasing agent, such as silicone, onto a surface of a film composed of polyethylene terephthalate, or the like.

The thermosensitive adhesive of the present embodiment described above is suitably usable in the fields in which all of handling performance, chemical resistance, heat resistance, and easy peeling property. Specifically, the thermosensitive adhesive of the present embodiment is suitably usable for temporarily securing the plastic substrate in a production process for the FPDs.

The present invention is described in further detail below by illustrating examples. However, the present invention is not limited to the following examples.

Examples 1-11 and Comparative Examples 1-7

<Production of Thermosensitive Adhesive Sheets>

Firstly, a mixture was obtained by respectively mixing monomers presented in Table 1 in proportions presented in Table 1. The used monomers were as follows.

C22A: behenyl acrylate
C18A: stearyl acrylate
C16A: cetyl acrylate
C1A: methyl acrylate
AA: acrylic acid
RFC: the reactive fluorine compound "Biscoat 3F" represented by the above formula (Ia), produced by OSAKA ORGANIC CHEMICAL INDUSTRY LTD.

Subsequently, a mixed solution was obtained by adding the obtained mixture into 200 parts by weight of a mixed solvent in which a weight ratio of ethyl acetate to toluene was 8:2. The monomers were respectively polymerized by stirring the obtained mixed solution at 55° C. for four hours, thereby obtaining a copolymer.

After acetylacetone was added into 100 parts by weight of the obtained copolymer, a metal chelate compound and a tackifier in terms of solid content were added in proportions presented in Table 1. The acetylacetone was added in the same proportion as the metal chelate compound. It was confirmed at that time that viscosity increased later in time in the case of adding the acetylacetone than the case of adding no acetylacetone.

Here, "metal chelate" in Table 1 denotes a metal chelate compound. The used metal chelate compound and the used tackifier were as follows.

Metal Chelate Compounds:

Al: aluminum trisacetylacetonate is "Alumichelate A(W)™," produced by Kawaken Fine Chemicals Co., Ltd.;

Ti: titanium tetraacetylacetonate is "Orgatics TC-401™," produced by Matsumoto Fine Chemical Co., Ltd.; and Zr: zirconium tetraacetylacetonate is "Orgatics ZC-150™," produced by Matsumoto Fine Chemical Co., Ltd.

Tackifier: polymerized rosin ester having a softening point of 150° C. or more, is "Pensel D-160™" produced by Arakawa Chemical Industries, Ltd.

Subsequently, a coating solution was obtained by adjusting the copolymer with ethyl acetate so as to have a solid content of 30% by weight. A thermosensitive adhesive sheet, which had a thickness of 25 μm and was composed of a thermosensitive adhesive containing a side chain crystal polymer, was obtained by applying the obtained coating solution onto the mold releasing film and heating at 100° C. for 10 minutes so as to be subjected to a crosslinking reaction. The used mold releasing film was one having a thickness of 50 μm, in which silicone was applied onto a surface of a polyethylene terephthalate film.

<Evaluations>

The obtained thermosensitive adhesive sheets were respectively evaluated in terms of weight average molecular weight, melting point, storage elastic modulus E' at 200° C., 180° peel strength at 5° C., affixing property, handling performance, chemical resistance, resistance to floating of the substrate, resistance to dimensional change of the substrate, easy peeling property, and pot life. Their respective evaluation methods are described below, and their respective results are presented in Table 1.

The thermosensitive adhesive sheets used in these evaluations were evaluated with the mold releasing film removed therefrom. The plastic substrates used in these evaluations are as follows.

Plastic Substrate: a 25-μm thick polyimide substrate "100H", produced by DuPont-Toray Co., Ltd.

(Weight Average Molecular Weight)

A weight average molecular weight was measured by measuring the copolymer with a GPC and expressing a measured value in terms of polystyrene. Results thus obtained are respectively presented in a column of "MW" in Table 1.

(Melting Point)

A melting point of the side chain crystal polymer was measured by measuring the thermosensitive adhesive sheet under measuring condition of 10° C./min by a DSC. The measurement of the melting point was carried out using a thermosensitive adhesive sheet produced in the same manner as in the production of the thermosensitive adhesive sheet described above, except that no tackifier was added.

(Storage Elastic Modulus E' at 200° C.)

A storage elastic modulus E' at 200° C. of the thermosensitive adhesive sheet was measured in a temperature increasing process from −10 to 220° C. at 1 Hz and 5° C./min by using a dynamic viscoelasticity measuring device "DMS 6100" produced by Seiko Instruments Inc. Results thus obtained are respectively presented in a column of "220° C.—elastic modulus" in Table 1.

(180° Peel Strength at 5° C.)

Firstly, the plastic substrate was secured onto the glass base with the thermosensitive adhesive sheet interposed therebetween in an atmospheric temperature of 50° C. The atmospheric temperature was then raised to 200° C., and this was left to stand for 20 minutes as it was. Thereafter, the atmospheric temperature was reduced to 5° C., and the plastic substrate was peeled at an angle of 180 degrees from the thermosensitive adhesive sheet at a speed of 300 mm/min by using a load cell. The 180° peel strength at that time was measured according to JIS 20237. Results thus obtained are presented in a column of "5° C.—peel strength."

(Affixing Property)

The plastic substrate was secured onto the glass base with the thermosensitive adhesive sheet interposed therebetween in an atmospheric temperature of 50° C. Affixing property of the thermosensitive adhesive sheet was evaluated by visually observing a state of the plastic substrate at that time.

Results thus obtained are present in a column of "affixing." Evaluation criteria were established as follows:

Symbol "O": The plastic substrate was satisfactorily affixed;

Symbol "Δ": Slight floating is observed on the plastic substrate, or it is difficult to affix the plastic substrate; and Symbol "x": Floating was observed on the plastic substrate, or it is impossible to affix the plastic substrate.

(Handling Performance)

The plastic substrate was secured onto the glass base with the thermosensitive adhesive sheet interposed therebetween in an atmospheric temperature of 50° C. Thereafter, the plastic substrate was carried and disposed at an atmospheric temperature of 23° C. Handling performance of the thermosensitive adhesive sheet at that time was evaluated. Results thus obtained are respectively presented in a column of "handling" in Table 1. Evaluation criteria were established as follows:

Symbol "O": It was possible to secure the plastic substrate onto the glass base, and the plastic substrate remained being secured onto the glass base even after the plastic substrate was carried and disposed; and Symbol "x": It was impossible to secure the plastic substrate onto the glass base, or the plastic substrate was peeled off from the glass base after the plastic substrate was carried and disposed.

(Chemical Resistance)

Firstly, the plastic substrate was secured onto the glass base with the thermosensitive adhesive sheet interposed therebetween in an atmospheric temperature of 50° C. In a state in which the atmospheric temperature of 50° C. was retained, chemical resistance of the thermosensitive adhesive sheet was evaluated by visually observing a state of the plastic substrate after being immersed for 10 minutes in each of a chemical solution of 2.38% by weight of tetramethylammonium hydroxide (TMAH) and a chemical solution of 15% by weight of hydrochloric acid (HCl). Results thus obtained are present in a column of "chemical resistance" in Table 1. Evaluation criteria were established as follows:

Symbol "O": No floating was observed on the plastic substrate; and

Symbol "x": Floating was observed on the plastic substrate.

(Resistance to Floating of Substrate)

Firstly, the plastic substrate was secured onto the glass base with the thermosensitive adhesive sheet interposed therebetween in an atmospheric temperature of 50° C. Then, the atmospheric temperature was raised to 200° C., and resistance to floating of the substrate was evaluated by visually observing a state of the plastic substrate after being left to stand for 60 minutes. Results thus obtained are present in a column of "floating" of "substrate" in Table 1. Evaluation criteria were established as follows:

Symbol "O": No floating was observed on the plastic substrate; and

Symbol "x": Floating was observed on the plastic substrate.

(Resistance to Dimensional Change of Substrate)

Firstly, the plastic substrate was secured onto the glass base with the thermosensitive adhesive sheet interposed therebetween in an atmospheric temperature of 50° C. Then, the atmospheric temperature was raised to 200° C., and resistance to dimensional change of the substrate was evaluated by visually observing a state of the plastic substrate after being left to stand for 60 minutes. Results thus obtained are present in a column of "dimensional change" of "substrate" in Table 1. Evaluation criteria were established as follows:

Symbol "O": No dimensional change was observed on the plastic substrate; and

Symbol "x": A dimensional change was observed on the plastic substrate.

(Easy Peeling Property)

Easy peeling property of the thermosensitive adhesive sheet was evaluated from the measurement results of the 180° peel strength at 5° C. Results thus obtained are presented in a column of "easy peeling" in Table 1. Evaluation criteria were established as follows:

Symbol "O": The 180° peel strength at 5° C. is 0.1 N/25 mm or less;

Symbol "Δ": The 180° peel strength at 5° C. is more than 0.1 N/25 mm and less than 0.15 N/25 mm; and Symbol "x": The 180° peel strength at 5° C. is 0.15 N/25 mm or more.

(Pot Life)

Pot life was evaluated by measuring viscosity of the coating solution obtained in the production process of the thermosensitive adhesive sheet. Measurement conditions of the viscosity are as follows.

Measuring Device: B-type VISCOMETER "BL", produced by TOKI SANGYO CO., LTD.

Rotor: No. 2

Number of Revolution: 12 rpm

Measurement Temperature: 23° C.

Evaluation criteria were established as follows. In the following evaluation criteria, the term "pot life" denotes a period of time in which the viscosity of the coating solution is less than 20,000 Pa·s.

Symbol "O": The pot life is one hour or more; Symbol "Δ": The pot life is one minute or more and less than one hour; and Symbol "x": The pot life is less than one minute.

TABLE 1

| | Monomer blend[1] | | | | | | Metal chelate[2] | | | Tackifier[2] | MW | Melting point (° C.) | 200° C. elastic modulus (MPa) |
|---|---|---|---|---|---|---|---|---|---|---|---|---|---|
| | C22A | C18A | C16A | C1A | AA | RFC | Al | Ti | Zr | | | | |
| Example 1 | 0 | 28 | 0 | 62 | 5 | 5 | 10 | — | — | 20 | 520 thousand | 25 | 0.82 |
| Example 2 | 0 | 30 | 0 | 60 | 5 | 5 | 10 | — | — | 20 | 550 thousand | 27 | 0.85 |
| Example 3 | 0 | 25 | 0 | 65 | 5 | 5 | 10 | — | — | 20 | 600 thousand | 22 | 0.8 |
| Comparative Example 1 | 0 | 0 | 30 | 60 | 5 | 5 | 10 | — | — | 20 | 520 thousand | 12 | 0.64 |
| Comparative Example 2 | 30 | 0 | 0 | 60 | 5 | 5 | 10 | — | — | 20 | 550 thousand | 45 | 0.98 |
| Example 4 | 0 | 25 | 0 | 60 | 5 | 10 | 10 | — | — | 20 | 610 thousand | 23 | 0.42 |
| Comparative Example 3 | 0 | 30 | 0 | 65 | 5 | 0 | 10 | — | — | 20 | 550 thousand | 25 | 0.11 |
| Comparative Example 4 | 0 | 23 | 0 | 57 | 5 | 15 | 10 | — | — | 20 | 510 thousand | 25 | 0.08 |
| Example 5 | 0 | 28 | 0 | 62 | 5 | 5 | 3 | — | — | 20 | 580 thousand | 25 | 0.51 |
| Example 6 | 0 | 28 | 0 | 62 | 5 | 5 | 6 | — | — | 20 | 550 thousand | 25 | 0.71 |
| Comparative Example 5 | 0 | 28 | 0 | 62 | 5 | 5 | 1 | — | — | 20 | 530 thousand | 25 | 0.07 |
| Comparative Example 6 | 0 | 28 | 0 | 62 | 5 | 5 | 15 | — | — | 20 | 610 thousand | 25 | 1.8 |
| Example 7 | 0 | 28 | 0 | 62 | 5 | 5 | 10 | — | — | 10 | 570 thousand | 25 | 1.5 |
| Comparative Example 7 | 0 | 28 | 0 | 62 | 5 | 5 | 10 | — | — | 0 | 550 thousand | 25 | 0.73 |
| Example 8 | 0 | 28 | 0 | 62 | 5 | 5 | — | 10 | — | 20 | 520 thousand | 25 | 1.1 |
| Example 9 | 0 | 28 | 0 | 62 | 5 | 5 | — | — | 10 | 20 | 520 thousand | 25 | 1.2 |
| Example 10 | 0 | 28 | 0 | 62 | 5 | 5 | 10 | — | — | 5 | 520 thousand | 25 | 1.6 |
| Example 11 | 0 | 28 | 0 | 62 | 5 | 5 | 10 | — | — | 35 | 520 thousand | 25 | 0.65 |

| | 5° C.[3] peel strength | Affixing | Handling | Chemical resistance | Substrate Floating | Substrate Dimensional change | Easy peeling | Pot life |
|---|---|---|---|---|---|---|---|---|
| Example 1 | <0.05 | o | o | o | o | o | o | o |
| Example 2 | <0.05 | o | o | o | o | o | o | o |

TABLE 1-continued

| | | | | | | | | |
|---|---|---|---|---|---|---|---|---|
| Example 3 | <0.05 | ○ | ○ | ○ | ○ | ○ | ○ | ○ |
| Comparative Example 1 | 1.3 | ○ | ○ | ○ | ○ | ○ | x | ○ |
| Comparative Example 2 | <0.05 | ○ | x | ○ | ○ | ○ | ○ | ○ |
| Example 4 | <0.05 | ○ | ○ | ○ | ○ | ○ | ○ | ○ |
| Comparative Example 3 | 0.2 | ○ | ○ | ○ | ○ | ○ | x | ○ |
| Comparative Example 4 | <0.05 | x | ○ | ○ | x | x | ○ | ○ |
| Example 5 | 0.05 | ○ | ○ | ○ | ○ | ○ | ○ | ○ |
| Example 6 | <0.05 | ○ | ○ | ○ | ○ | ○ | ○ | ○ |
| Comparative Example 5 | 0.15 | ○ | ○ | x | x | x | x | ○ |
| Comparative Example 6 | <0.05 | x | ○ | ○ | ○ | ○ | ○ | ○ |
| Example 7 | 0.1 | ○ | ○ | ○ | ○ | ○ | ○ | ○ |
| Comparative Example 7 | 0.2 | ○ | ○ | ○ | ○ | ○ | x | ○ |
| Example 8 | <0.05 | ○ | ○ | ○ | ○ | ○ | ○ | Δ |
| Example 9 | <0.05 | ○ | ○ | ○ | ○ | ○ | ○ | Δ |
| Example 10 | 0.12 | ○ | ○ | ○ | ○ | ○ | Δ | ○ |
| Example 11 | <0.05 | Δ | ○ | ○ | ○ | ○ | ○ | ○ |

[1] The values indicate part by weight.
[2] The values indicate the amount of addition (part by weight) with respect to 100 parts by weight of a copolymer.
[3] The unit is N/25 mm.

As apparent from Table 1, all of Examples 1 to 11 are excellent in all of handling performance, chemical resistance, heat resistance (resistance to floating of the substrate and resistance to dimensional change of the substrate), and easy peeling property, in addition to affixing property. A comparison among Examples 1, 5, and 6, which have the same monomer blend and the same amount of addition of the tackifier, and have different amounts of addition of the metal chelate compound, shows the result that the storage elastic modulus E' at 200° C. increases with increasing the amount of addition of the metal chelate compound. Examples 1 and 6 show more excellent results than Example 5 in terms of 180° peel strength at 5° C. A comparison among Examples 1, 8, and 9, which have the same monomer blend and the same amount of addition of the tackifier, and have different amounts of addition of the metal chelate compound, shows the result that Example 1 using aluminum trisacetylacetonate has more excellent pot life than Examples 8 and 9. In Example 1, the viscosity of the coating solution after 24 hours from the time when the coating solution was prepared was less than 2,000 mPa·s.

Comparative Example 1 having a melting point of lower than 20° C. shows the result of being inferior in easy peeling property because the 180° peel strength at 5° C. is 0.15 N/25 mm or more. Comparative Example 2 having a melting point of higher than 30° C. shows the result of being inferior in handling performance.

Comparative Example 3 containing the reactive fluorine compound of less than 1 part by weight shows the result of being inferior in easy peeling property because the 180° peel strength at 5° C. is 0.15 N/25 mm or more. Comparative Example 4, in which (meth)acrylate having a straight chain alkyl group having 16 to 22 carbon atoms is less than 25 parts by weight, (meth)acrylate having an alkyl group having 1 to 6 carbon atoms is less than 60 parts by weight, and the reactive fluorine compound is greater than 10 parts by weight, shows the result of being inferior in affixing property, and the result of being inferior in heat resistance because the storage elastic modulus E' at 200° C. is smaller than 0.1 MPa.

Comparative Example 5 in which the amount of addition (A) of the metal chelate compound is less than 3 parts by weight shows the result of being inferior in the resistance because the storage elastic modulus E' at 200° C. is smaller than 0.1 MPa. Comparative Example 5 also shows the result of being inferior in chemical resistance. Furthermore, Comparative Example 5 shows the result of being inferior in easy peeling property because the 180° peel strength at 5° C. is 0.15 N/25 mm or more. Comparative Example 6 in which the amount of addition (A) of the metal chelate compound is more than 10 parts by weight shows the result of being inferior in affixing property.

Comparative Example 7 containing no tackifier shows the result of being inferior in easy peeling property because the 180° peel strength at 5° C. is more than 0.15 N/25 mm.

The invention claimed is:

1. A thermosensitive adhesive comprising:
    a side chain crystal polymer having a melting point of 20-30° C. obtained by adding an amount of addition (A) of a metal chelate compound and an identical amount of a crosslinking delaying agent into a copolymer, followed by a crosslinking reaction; and
    a tackifier,
    wherein adhesive strength becomes deteriorated at a temperature below the melting point,
    wherein the copolymer is obtained by polymerizing 25-30 parts by weight of (meth) acrylate having a straight-chain alkyl group having 16 to 22 carbon atoms, 60-65 parts by weight of (meth) acrylate having an alkyl group having 1 to 6 carbon atoms, 1-10 parts by weight of a polar monomer, and 1-10 parts by weight of a reactive fluorine compound, and
    wherein the amount of addition (A) is 6-10 parts by weight with respect to 100 parts by weight of the copolymer.

2. The thermosensitive adhesive according to claim 1, wherein the (meth) acrylate having a straight-chain alkyl group having 16 to 22 carbon atoms is stearyl (meth) acrylate,
    wherein the (meth) acrylate having an alkyl group having 1 to 6 carbon atoms is methyl (meth) acrylate,
    wherein the polar monomer is acrylic acid,
    wherein the reactive fluorine compound is a compound represented by a following formula (I), and wherein the metal chelate compound is aluminum trisacetylacetonate,

 (I)

wherein $R_1$ is a group: $CH_2\!=\!CHCOOR^2\!-$ or $CH_2\!=\!C(CH_3)COOR^2\!-$ (wherein $R^2$ is an alkylene group).

3. The thermosensitive adhesive according to claim 1, wherein the reactive fluorine compound is a compound represented by a following formula (Ia):

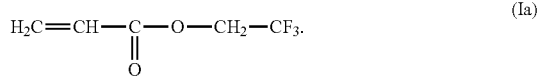 (Ia)

4. The thermosensitive adhesive according to claim 1, wherein the metal chelate compound is acetylacetone coordinated compound of aluminum.

5. The thermosensitive adhesive according to claim 1, wherein the tackifier has a softening point of 100° C. or more.

6. The thermosensitive adhesive according to claim 1, wherein the tackifier is a polymerized rosin ester.

7. The thermosensitive adhesive according to claim 1, wherein an amount of addition (B) of the tackifier is 10-30 parts by weight with respect to 100 parts by weight of the copolymer.

8. The thermosensitive adhesive according to claim 1, wherein the copolymer has a weight average molecular weight of 450,000-650,000.

9. The thermosensitive adhesive according to claim 1, wherein 180° peel strength at an atmospheric temperature of 5° C. is 0.1 N/25 mm or less.

10. The thermosensitive adhesive according to claim 1, wherein an adherend being affixed with the thermosensitive adhesive is exposed to an atmospheric temperature of 100-220° C. and is thereafter removed at a temperature below the melting point.

11. The thermosensitive adhesive according to claim 1, the thermosensitive adhesive being used for temporarily securing a plastic substrate.

12. The thermosensitive adhesive according to claim 1, wherein the crosslinking delaying agent is acetylacetone.

13. A sheet of the thermosensitive adhesive according to claim 1 having a storage elastic modulus E' at 200° C. is 0.1 MPa or more.

14. A thermosensitive adhesive sheet comprising the thermosensitive adhesive according to claim 1.

15. A thermosensitive adhesive tape comprising an adhesive layer comprising the thermosensitive adhesive according to claim 1, the adhesive layer being laminated on one surface or both surfaces of a film-shaped substrate.

* * * * *